(12) United States Patent
Sethi et al.

(10) Patent No.: US 11,720,434 B2
(45) Date of Patent: Aug. 8, 2023

(54) DATA COLLECTION AGENT TRAINED FOR TELEMETRY DATA COLLECTION

(71) Applicant: Dell Products L.P., Round Rock, TX (US)

(72) Inventors: Parminder Singh Sethi, Ludhiana (IN); Landon Martin Chambers, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 378 days.

(21) Appl. No.: 17/157,257

(22) Filed: Jan. 25, 2021

(65) Prior Publication Data

US 2022/0237061 A1 Jul. 28, 2022

(51) Int. Cl.
*G06F 11/07* (2006.01)
*G06N 5/043* (2023.01)
*G06F 11/32* (2006.01)
*G06N 3/08* (2023.01)
*G06Q 30/016* (2023.01)

(52) U.S. Cl.
CPC .......... *G06F 11/079* (2013.01); *G06F 11/321* (2013.01); *G06N 3/08* (2013.01); *G06N 5/043* (2013.01); *G06Q 30/016* (2013.01)

(58) Field of Classification Search
CPC ....... G06F 11/079; G06F 11/321; G06N 3/08; G06N 5/043; G06Q 30/016
See application file for complete search history.

(56) References Cited

U.S. PATENT DOCUMENTS

| 10,652,109 | B1 | 5/2020 | Seth et al. |
| 2019/0205232 | A1* | 7/2019 | Ayyagari ............ G06F 11/2205 |
| 2020/0314022 | A1* | 10/2020 | Vasseur ................... H04L 45/22 |
| 2020/0356834 | A1* | 11/2020 | Zhou ...................... G06N 20/00 |
| 2021/0157985 | A1* | 5/2021 | Rotkop ................ G06F 40/205 |

* cited by examiner

*Primary Examiner* — Eric Nilsson
(74) *Attorney, Agent, or Firm* — Ryan, Mason & Lewis, LLP

(57) ABSTRACT

An apparatus comprises at least one processing device that is configured to implement a data collection agent and obtain a telemetry data collection specification. The at least one processing device is configured to train the data collection agent based at least in part on the telemetry data collection specification and to obtain an issue description corresponding to a technical support issue associated with a source device of an information processing system. The at least one processing device is configured to generate a telemetry data collection query based at least in part on the obtained issue description using the trained data collection agent and to submit the query to the source device. The at least one processing device is configured to obtain from the source device, telemetry data generated based at least in part on the query and to present the telemetry data to a user via a graphical user interface.

20 Claims, 7 Drawing Sheets

| Complex Element | Partial Collection ID |
|---|---|
| Main Chassis | 1 |
| BIOS | 1 |
| Front Panel | 1 |
| FRU | 1 |
| Battery | 2 |
| Power Supply | 3 |
| Power Supply Redundancy | 3 |
| Voltages | 3 |
| Power Management | 3 |
| Processors | 4 |
| Fan | 5 |
| Fan Redundancy | 5 |
| Networks | 6 |
| Port | 6 |
| Remote Access | 6 |
| Removable Flash Media | 7 |
| Slot | 7 |
| Temperatures | 8 |
| Auto Recovery | 9 |
| Hardware Log | 10 |
| Storage | 11 |
| Software | 12 |

FIG. 5

DATA COLLECTION AGENT TRAINED FOR TELEMETRY DATA COLLECTION

FIELD

The field relates generally to information processing systems, and more particularly to issue resolution in information processing systems.

BACKGROUND

Efforts to completely automate the technical support issue resolution process often fall short due to gaps in artificial intelligence (AI) generalization and data collection. Instead, human-centered technical support remains the most reliable approach to resolving complex issues that require diagnostic testing and customer and device interaction. While the collection of telemetry data can often expedite the resolution of technical support issues, technical support agents (TSAs) may struggle to utilize the collected telemetry data since the telemetry data often comprises large volumes of information in a hard to read format, e.g., thousands of lines of telemetry, and it is not always apparent to the TSA which portion of the telemetry data is relevant to the technical support issue at hand.

SUMMARY

In one embodiment, an apparatus comprises at least one processing device comprising a processor coupled to memory, with the at least one processing device being configured to implement a data collection agent and to obtain a telemetry data collection specification. The at least one processing device is further configured to train the data collection agent based at least in part on the telemetry data collection specification and to obtain an issue description corresponding to a technical support issue associated with a source device of an information processing system. The at least one processing device is further configured to generate a telemetry data collection query based at least in part on the obtained issue description using the trained data collection agent and to submit the query to the source device. The at least one processing device is further configured to obtain, from the source device, telemetry data generated based at least in part on the query and to present the telemetry data to a user via a graphical user interface.

These and other illustrative embodiments include, without limitation, apparatus, systems, methods and processor-readable storage media.

BRIEF DESCRIPTION OF THE DRAWINGS

FIG. 5 is an example table of complex element attributes and their groupings in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
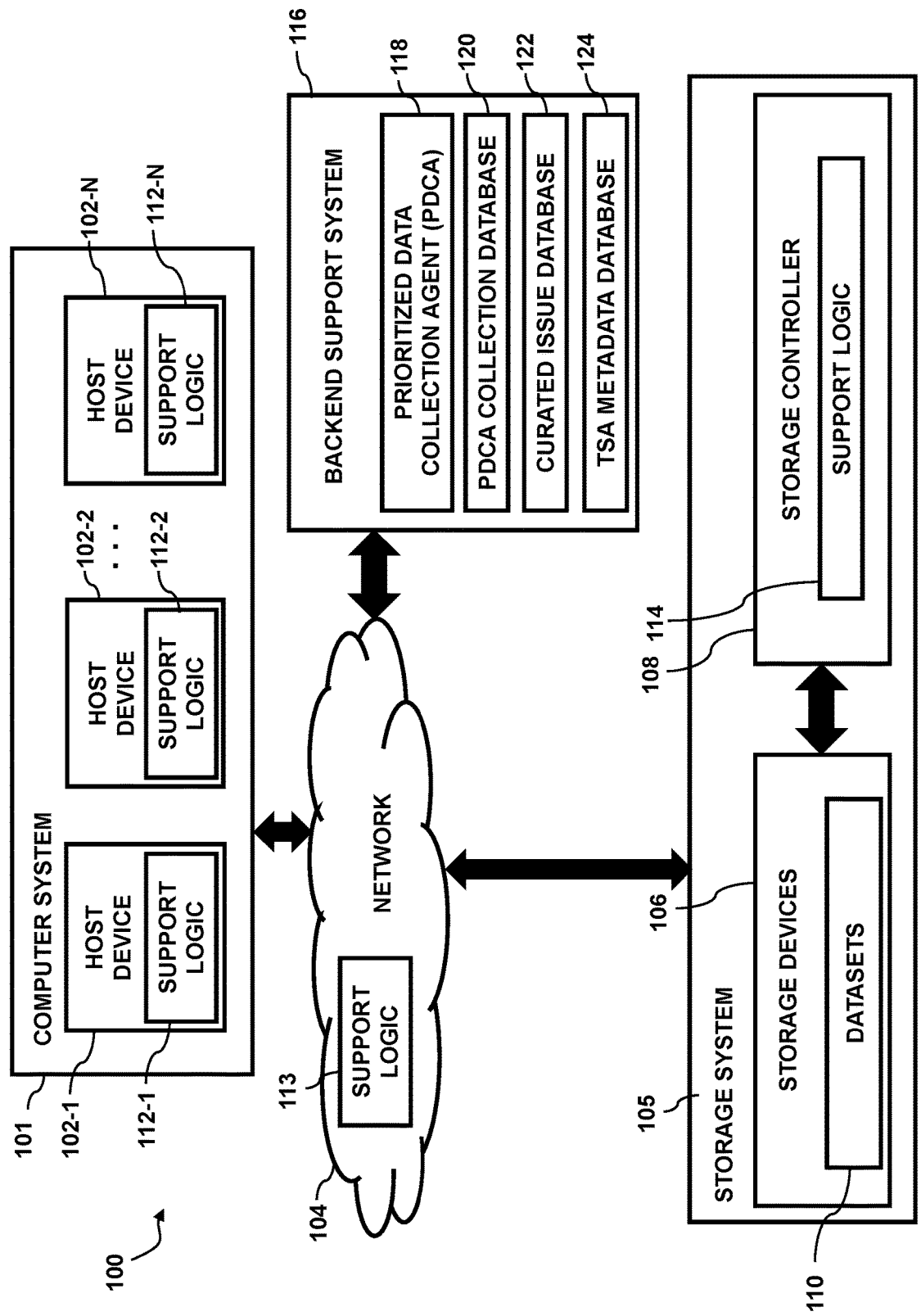
FIG. 1 is a block diagram of an information processing system in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105 and a backend support system 116. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102, storage system 105 and backend support system 116 illustratively comprise respective processing devices of one or more processing platforms. For example, the host devices 102, storage system 105 and backend support system 116 can each comprise one or more processing devices each having a processor and a memory, possibly implementing virtual hosts such as, e.g., virtual machines, containers, virtual appliances, or other virtualization infrastructure, although numerous other configurations are possible.

The host devices 102, storage system 105 and backend support system 116 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102, storage system 105 and backend support system 116 may be implemented on a common processing platform, or on separate processing platforms.

The host devices 102 are configured to write data to and read data from the storage system 105 in accordance with applications executing on those host devices 102 for system users.

In illustrative embodiments, the host devices 102 comprise respective support logic 112-1, 112-2 . . . 112-N, also referred to herein collectively or individually as support logic 112, the function of which will be described in more detail below.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art. In illustrative embodiments, network 104 implements support logic 113 on one or more of the network processing devices, the function of which will be described in more detail below.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array. Other types of storage arrays can be used to implement storage system 105 in other embodiments.

The storage controller 108 comprises processing devices, memory, or other circuitry that may be utilized, for example, to service IO operations that are received from the host devices 102 or to perform any other operations associated with the storage system 105. While storage controller 108 may be described as comprising particular configurations herein, storage controller 108 is not limited to the disclosed embodiments and may comprise any other configuration of electrical and software components. In illustrative embodiments, storage controller 108 comprises support logic 114 that is similar to support logic 112, the function of which will be described in more detail below.

The backend support system 116 comprises processing devices, memory, or other circuitry that may be utilized, for example, to support technical support operations by a TSA. While backend support system 116 may be described as comprising particular configurations herein, backend support system 116 is not limited to the disclosed embodiments and may comprise any other configuration of electrical and software components. In illustrative embodiments, backend support system 116 comprises a prioritized data collection agent (PDCA) 118, a PDCA collection database 120, a curated issue database 122, and a TSA metadata database 124, the functionality of each of which will be described in more detail.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays, software-defined storage products, cloud storage products, object-based storage products and scale-out NAS clusters comprising platform nodes and associated accelerators. Combinations of multiple ones of these and other storage products can also be used in implementing a given storage system in an illustrative embodiment.

The storage system 105 should also be understood to include additional modules and other components typically found in conventional implementations of storage systems, although such additional modules and other components are omitted from the figure for clarity and simplicity of illustration.

The host devices 102, storage system 105 and backend support system 116 may be implemented on respective distinct processing platforms, although numerous other arrangements are possible. For example, in some embodiments at least portions of one or more of the host devices 102, storage system 105 and backend support system 116 are implemented on the same processing platform. In some embodiments, storage system 105 can be implemented at least in part within at least one processing platform that implements at least a portion of one or more of the host devices 102 and backend support system 116. In some embodiments, backend support system 116 can be implemented at least in part within at least one processing platform that implements at least a portion of one or more of the host devices 102 and storage system 105. In some embodiments, the host devices 102 can be implemented at least in part within at least one processing platform that implements at least a portion of one or more of storage system 105 and backend support system 116.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102, storage system 105 and backend support system 116 to reside in different data centers. Numerous other distributed implementations of one or both of the host devices 102, storage system 105 and backend support system 116 are possible.

Additional examples of processing platforms utilized to implement host devices, storage systems or backend support systems in illustrative embodiments will be described in more detail below in conjunction with FIGS. 6 and 7.

It is to be appreciated that these and other features of illustrative embodiments are presented by way of example only and should not be construed as limiting in any way.

Accordingly, different numbers, types and arrangements of system components such as host devices 102, network 104, storage system 105 and backend support system 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Illustrative embodiments are not limited to arrangements in which the functionality described herein is implemented in a host device, a storage system or a backend support system, and therefore encompass various hybrid arrangements in which the functionality described herein is distributed over one or more host devices, one or more associated storage systems and one or more backend support systems, each comprising one or more processing devices.

Telemetry data is collected from one or more source devices such as, e.g., host devices 102, storage system 105, network processing devices of the network 104 or other devices, also collectively and individually referred to herein more generally as source devices, using technical support assistance software implemented by support logic 112, 113 and 114, also collectively and individually referred to herein more generally as support logic, and is uploaded to backend support system 116 for the use by TSAs. In some embodiments, the telemetry data may be uploaded periodically by the support logic. The backend support system 116 may comprise, for example, one or more servers associated with the TSAs, manufacturer, or other entity that is involved in providing technical support to customers.

As the use of data streaming increases globally, the capabilities of the support logic have sometimes been enhanced to support the streaming of live telemetry data from the source devices to the backend support system 116. However, the live streaming of telemetry data may create some challenges for the backend support system 116 and the TSAs relying on the telemetry data to provide technical support.

Collecting telemetry data using end-to-end collection methods often takes a certain amount of time, e.g., 7-10 minutes or any other amount of time, which depends upon various factors. The factors may include, for example, the bandwidth of the connection between the source devices and the backend support system 116, the time needed by the support logic of the source device to collect all of the attributes from the various components of the source device, the time needed by the support logic of the source device to parse the collected data into a specific telemetry format, the time it takes for the support logic of the source device to upload the telemetry data to the backend support system 116, the time it takes the backend support system 116 to perform a virus scan on the uploaded telemetry data and the time it takes the backend support system 116 to process the telemetry data and make it available for the TSA, e.g., via a graphical user interface.

In one example scenario, a customer contacts a TSA of the backend support system 116 and indicates that there is a particular technical problem that needs to be resolved. The TSA discovers that the latest telemetry data for the source device that is at issue is not available or has not been received from the source device of the customer. Because the latest telemetry data is not available, the TSA initializes the collection of telemetry data. However, the collection of the latest telemetry data may require some additional time, e.g., 7-10 minutes or any other amount of time as mentioned above, which may result in a longer period in which the customer's data is not available for use due to the issue.

Live streaming telemetry data may provide a more efficient resolution but also has its own challenges. For example, telemetry data often does not have a one-to-one mapping for easy streaming as compared to other types of commonly live streamed data such as, e.g., music and videos, which are typically discrete files to be streamed. Instead, each source device comprises multiple components from which telemetry data may need to be obtained and in addition, each component may also comprise multiple properties or attributes to be collected.

In order to efficiently live stream telemetry data in a manner that best supports the TSA, functionality for the intelligent selection of the telemetry data to be live streamed is disclosed in illustrative embodiments. The process and functionality is configured to build an artificial intelligence or machine learning algorithm, in the form of PDCA 118, which can automatically make certain determinations.

For example, the PDCA 118 may be configured or trained to determine or select the first component of the source device from which the telemetry data collection should initially be started, the order or sequence in which telemetry data collection should be performed on the components of the source device, which properties of a given component of the source device need to be collected before moving on to the next component and other similar determinations. For example, in some cases, all of the properties of a component may need to be collected before moving on to the next component in the sequence. In other cases, only a subset of the properties of a component may be collected before moving on to the next component in the sequence. In some cases, the properties that are collected may also differ between the various components in the sequence. For example, in some cases, all of the properties of one component may be collected while only a subset of the properties of another component may be collected.

The PDCA 118 may also be configured or trained to determine whether or not the telemetry data collection can be performed on two or more components of the source device in parallel or instead needs to be performed in sequence. For example, in some cases, the bandwidth and processing resources needed to collect telemetry data for a particular component may be smaller than the available bandwidth or processing resources. In such a case, the PDCA 118 may determine that parallel collection may be utilized.

The PDCA 118 may also be configured or trained to determine whether or not the sequence of telemetry data collection from the components remains the same in a manual collection mode, a periodic collection mode and an alert-based collection mode of telemetry data collection. In the manual mode, a user accesses the support logic of the source devices to drive collection of specific telemetry data. In a periodic mode, telemetry data is automatically collected from the source devices according to a predetermined schedule, e.g., periodically. In alert-based mode, telemetry data is collected in response to an alert that is issued to the backend support system 116 by the support logic that indicates that there is an issue with a source device.

In order to efficiently handle the live streaming of telemetry data, the backend support system 116 implements the PDCA 118 which comprises functionality for the intelligent selection of the telemetry data to be live-streamed by the support logic such that the support logic will collect and stream the telemetry data to the backend support system 116 in the most efficient manner for the problem at issue. By leveraging intelligent streaming by the backend support system 116 enhanced with PDCA 118, the TSA can swiftly diagnose issues by collecting the latest telemetry data associated with the particular problem while being on a call with the customer instead of waiting a significant amount of time to collect a full set of telemetry data.

The PDCA 118 is configured to minimize the amount of telemetry data collections required for a TSA to resolve a system issue in the shortest amount of time possible. The priority of the telemetry data collections is continuously updated in the PDCA 118 using reinforcement learning to learn data collection strategies that supply the smallest amount of telemetry data possible to the TSA that still allows for fast resolution of a technical problem while avoiding wasteful telemetry data collection strategies. The PDCA 118 is trained through interactions with TSAs and their resolutions of technical problems to learn efficient data collection strategies over a large variety of issues and TSA diagnostic styles.

The PDCA 118 is also configured to maximize the relevancy of telemetry data collection to the technical issue or problem at hand. In some cases, for example, the amount of customer data that the TSA has to consider while solving an issue may be minimized by the PDCA 118 such that only relevant telemetry data that is associated with the technical issue or problem needs to be collected from the source devices of the information processing system 100.

Figure 2:
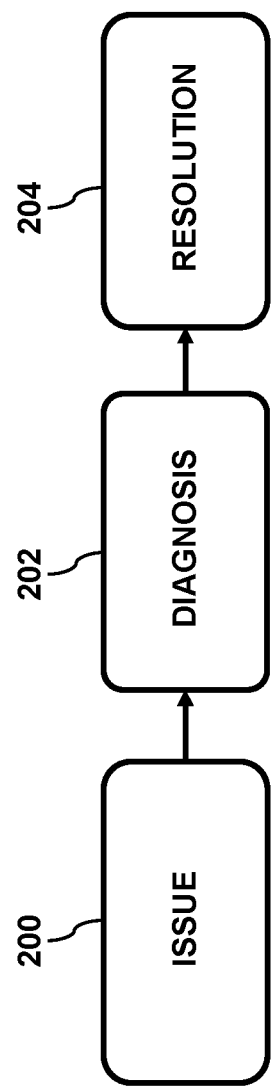
FIG. 2 is a flow diagram illustrating an example technical support issue resolution process in an illustrative embodiment.

With reference now to FIG. 2, a high-level technical support process is illustrated.

As seen in FIG. 2, a customer communicates a system issue 200 to a TSA, who performs a diagnostic process to determine the root cause of the issue 200, also referred to as a diagnosis 202. Actions are taken by the TSA until the issue 200 is resolved and the system returns to a normal operating state, also referred to as a resolution 204.

An issue 200 may comprise any technical problem associated with a customer's source devices that require assistance from a TSA of the backend support system 116 to achieve a resolution 204. The customer's understanding of the issue may comprise an issue description, e.g., a description of abnormal system behavior in an audio, text or other communication, which may be provided to the TSA, for example, via the support logic, telephone, e-mail, or in any other manner to the TSA or the backend support system 116. The issue description may comprise, for example, a list of symptoms, e.g., overheating, noisy fan, etc., and any additional description of abnormal behaviors, e.g., failing jobs, intermittent power loss, etc.

A diagnosis 202 is the TSA's hypothesis of the root cause of the symptom. The TSA may perform a series of diagnostic actions to understand the state of the system and hypothesize a root cause of the issue before attempting to resolve the issue. Diagnostic actions may include, for example, reading telemetry data collections from source devices of the system, asking the customer questions, running diagnostic tests on the source devices of the system or taking any other diagnostic actions that may help the TSA understand the state of the system.

The system state is defined as the physical state of the system and its source devices and may comprise a physical description of the system hardware based on thermodynamic or other measurements. While the true state of the system may not be directly observed, the system state may be at least partially observed and determined based on telemetry data collections comprising, for example, system architecture, hardware & software configurations, current running processes, sensor readings from hardware, alerts or other telemetry data, and also based on a refined issue description which comprises a TSA's curated version of the customer's issue description.

A resolution 204 is the termination of an issue 200 such that the system can return to a normal operating state through the TSA and customer performing a set of resolution actions. Resolution actions may include, for example, replacing hardware, replacing a connection such as a cable, reseating memory, updating drivers, reinstalling operating systems or any other actions.

Figure 3:
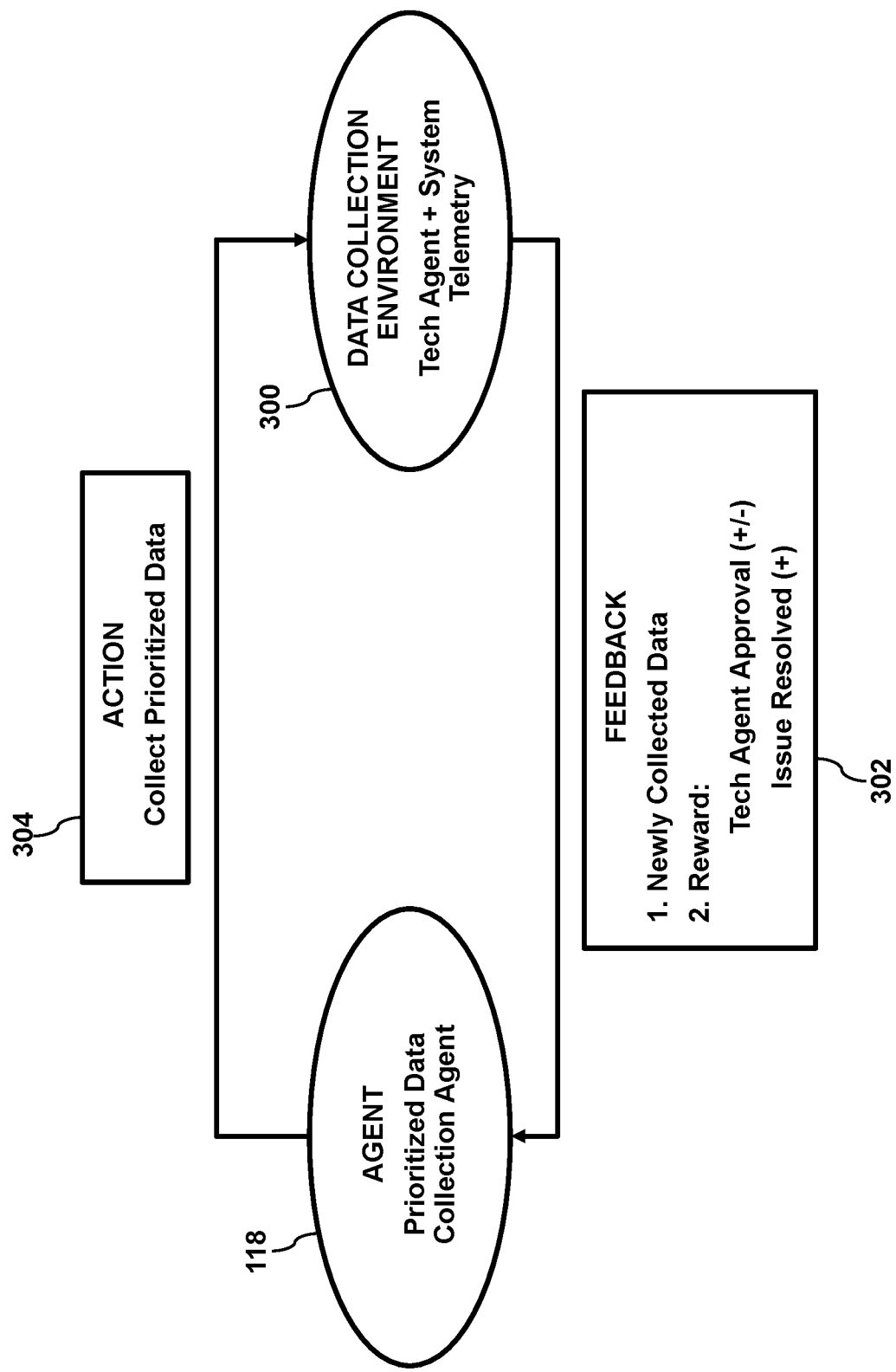
FIG. 3 is a block diagram illustrating an example interaction between a data collection agent and a data collection environment in an illustrative embodiment.

FIG. 3 is an example diagram illustrating an example process for technical support utilizing the functionality of the PDCA 118 and an environment that provides data and feedback for self-learning. As seen in FIG. 3, the interaction of the PDCA 118 with a Data Collection Environment (DCE) 300 comprising, for example, the source devices, a TSA or any other source of data, is illustrated. Initially, the TSA in the DCE 300 receives an issue description from the customer and generates a refined or curated issue description, e.g., an issue description in which the customer's issue statement of the issue is refined into a semi-standard format and language for use by the PDCA 118, and provides the refined or curated issue description to the PDCA 118 as feedback 302. The PDCA 118 is also trained with an initial policy using historical cases. The PDCA 118 leverages the refined issue description and the initial policy to determine the priority for the collection of the various portions of the system telemetry data and takes an action 304 to collect the highest priority data based on its determination from the source devices. The highest priority data is provided to the TSA in the DCE 300 and the TSA provides feedback 302 from the progress of the case back to the PDCA 118 which is used by the PDCA 118 to adjust the prioritization strategy within the PDCA 118 to improve the data collection strategy for the next time this or a similar issue occurs.

At a high-level, the PDCA 118 prioritizes and collects telemetry data from the DCE 300 with the goal of minimizing the amount of telemetry data required for a TSA to reach a resolution. The PDCA 118 sets collection prioritizations at every timestep using inputs from the DCE 300 including, e.g., input from the TSA and the telemetry data from the source devices. The feedback 302 input from the TSA may comprise, for example, the refined issue description, a positive or negative indication of the usefulness of the data provided from a prior collection, the diagnostic and resolution actions taken and characteristics of the tech agent such as, e.g., experience level, skill level, etc. The system telemetry data may comprise, for example, real-time streamed telemetry data collected since the start of the current diagnosis process which is collected and presented to the TSA in the prioritized order. The PDCA 118 continues to reprioritize its telemetry data collections based on the feedback 302 of the progress made by the TSA and the data within the telemetry data collections by continuously adjusting its collection strategy in a manner that is tailored to the issue that is being resolved, the diagnostic style of the TSA, the collected telemetry data itself and any progress made by the TSA in the form of diagnostic and resolution actions. By utilizing a reinforcement learning framework, the PDCA 118 learns over a history of diagnostic experience covering a wide variety of issues and TSA diagnostic styles, resulting in a trained model that provides a robust and purposeful data collection strategy.

Figure 4:
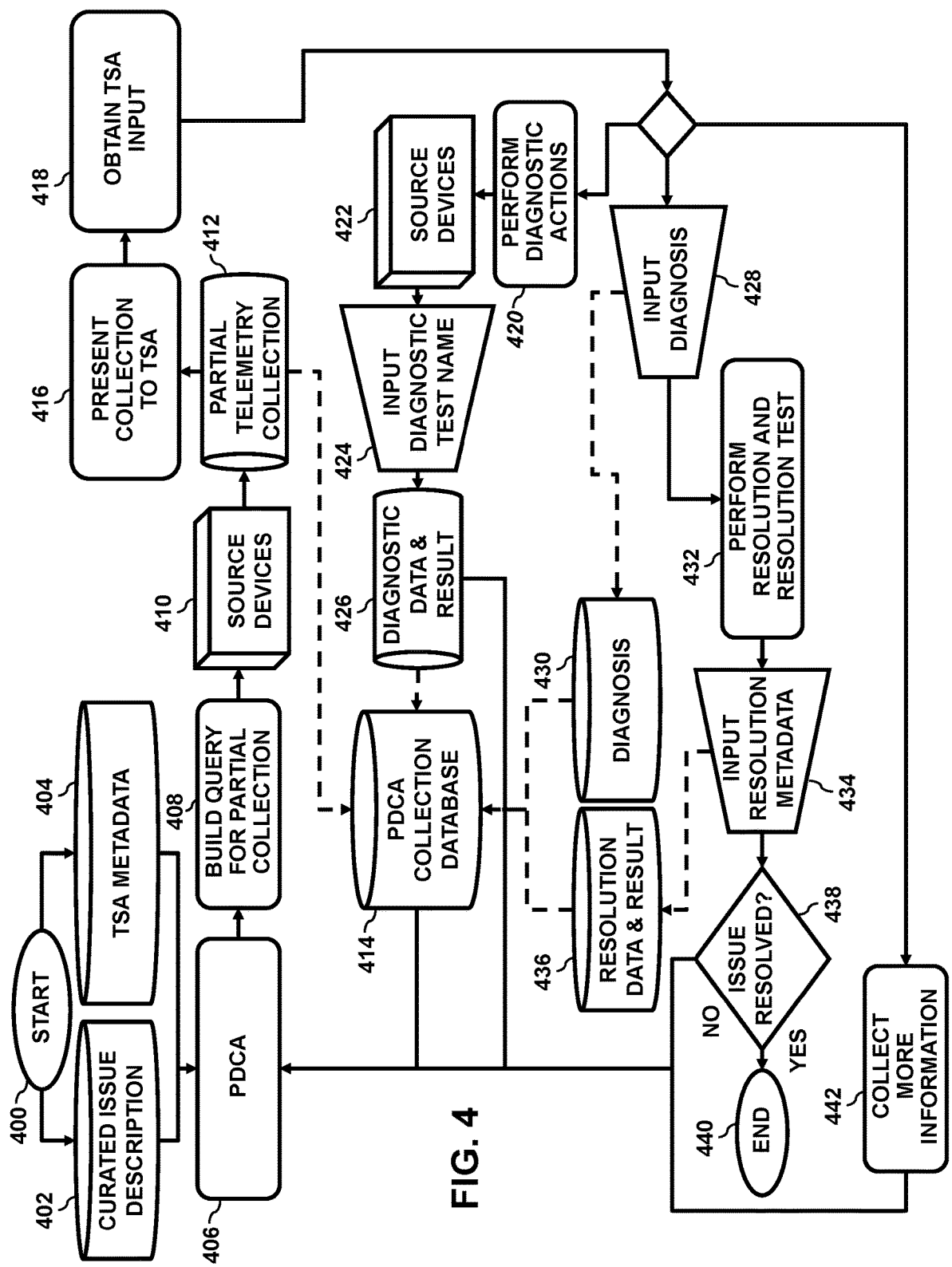
FIG. 4 is a flow diagram of an example technical support process utilizing an integrated prioritized data collection agent (PDCA) in an illustrative embodiment.

FIG. 4 illustrates an overview of the integration of the PDCA 118 into the technical support process. The process as shown in FIG. 4 includes steps 400 through 442 and is suitable for use in the system 100 but is more generally applicable to other types of systems comprising multiple host devices, a shared storage system and a backend support system. The process will be described with reference also to FIGS. 1-3.

As part of the process, the TSA may discover more about the state of the system, propose a diagnosis and attempt a resolution. The resolution is successful if the system returns to a normal operating state. If the resolution is unsuccessful, the TSA performs additional actions in conjunction with the PDCA 118 until a normal operating state is achieved. Case metadata, PDCA partial collection, diagnostic actions, resolution actions and test results are collected in the PDCA collection database 120 which can be used for both online and offline updating of the reinforcement learning-based collection policy for PDCA 118.

The process starts at step 400 and proceeds to steps 402 and 404 in parallel or in any order.

At step 402, the TSA receives the customer technical support description and generates a curated issue description. In some embodiments, the curated issue description may be added to a curated issue database 122 of curated issue descriptions. In some embodiments the curated issued description may be selected from a set of curated issue descriptions that are stored in the curated issue database 122 by the TSA. For example, the TSA may select the curated issue description from the curated issue database 122 that best matches the issue found in the customer technical support description. In some embodiments, the curated issue descriptions may be provided to the TSA using a graphical user interface (GUI) such as, e.g., a drop-down menu.

At step 404, TSA metadata is obtained, e.g., from a TSA metadata database 124. The TSA metadata database 124 may comprise information about the TSAs that utilize the backend support system 116. The information about each TSA may comprise, for example, an experience level of the TSA, a technical support style of the TSA, a number of cases solved by the TSA or other information about the TSA that may be relevant or useful to the PDCA for assisting the TSA in collecting the most useful and relevant telemetry data for the TSA to solve the current issue.

At step 406, the curated issue description and the TSA metadata is obtained and ingested by the PDCA 118. For example, PDCA 118 may take the curated issue description and the TSA metadata as inputs and may output information indicating which telemetry data of the source devices of the customer system is to be prioritized for partial data collection to a query builder. In some embodiments, the PDCA 118 may comprise the query builder. In some embodiments, the query builder may be another component of the backend support system 116.

At step 408, the query builder takes the information outputted by the PDCA 118 and builds a query for a partial telemetry data collection. The query is passed to the source devices at step 410 for collection of the data.

At step 410, the support logic of the source devices generates the partial telemetry data collection corresponding to the query and provides the partial telemetry data collection to the PDCA at step 412, e.g., by live-streaming the partial telemetry data collection based on the query. The partial telemetry data collection is archived in the PDCA collection database at step 414 and is also presented to the TSA at step 416, e.g., via a GUI presented on a display of a computing device associated with the TSA.

At step 418, the TSA utilizes the partial telemetry data collection in combination with their implicit knowledge and experiences to perform one or more of the following actions.
1) Perform a diagnostic action at step 420;
2) Make a diagnosis and proceed towards resolving the issue at step 428; or
3) Collect more information from the system at step 442.

At step 420, the TSA chooses to perform one or more diagnostic actions. The diagnostic action may be performed on one or more source devices at step 422 by the TSA or by the customer under the TSA's direction. For example, in some cases, the TSA may establish a remote connection to the one or more source devices and perform the one or more diagnostic actions via the remote connection. In some cases, the customer may be directed by the TSA to perform the one or more diagnostic actions on their own source devices. In some embodiments, both the TSA and the customer may each perform one or more diagnostic actions on the one or more source devices.

At step 424, in conjunction with the one or more diagnostic actions, the TSA inputs diagnostic information into the GUI of the display. For example, the diagnostic information may comprise a diagnostic test name, a diagnostic test result and any resulting errors from performing the diagnostic action.

At step 426, the diagnostic information is formatted into a standard format and added to the PDCA collection database 120 at step 414 for use in training or re-training the PDCA 118. The process then returns to step 406 and the formatted diagnostic information is provided to the PDCA 118 for use by the PDCA 118 in conjunction with the partial telemetry data collection to generate a new query for partial telemetry data collection.

Referring back to step 418, when the action taken by the TSA comprises inputting a diagnosis at step 428, the inputted diagnosis is formatted and added to a diagnosis database at step 430. The formatted diagnosis is also provided to the PDCA collection database 120 at step 414 for use in training or re-training the PDCA 118. In some embodiments, the diagnosis database may be stored on the backend support system 116 separately from the PDCA collection database 120. In some embodiments, the PDCA collection database 120 may comprise the diagnosis database. The process also proceeds to step 432.

At step 432, the TSA performs resolution actions until the system is believed to have returned to a normal operating state. To verify this, the TSA performs a resolution test, which is a diagnostic test where a PASS result indicates that the issue is resolved and a FAIL result indicates that the diagnosis is incorrect.

At step 434, in conjunction with the resolution actions and the result of the resolution test, the TSA inputs resolution metadata into the GUI of the display. The resolution metadata comprises information that indicates what resolution actions were performed and the results, e.g., PASS or FAIL, of any resolution tests that were performed. The resolution metadata is added to a resolution data and result database at step 436 and is also provided to the PDCA collection database 120 at step 414 for use in training or re-training the PDCA 118. In some embodiments, the resolution data and result database may be stored on the backend support system 116 separately from the PDCA collection database 120. In some embodiments, the PDCA collection database 120 may comprise the resolution data and result database. The process also proceeds to step 438.

At step 438, the PDCA 118 determines whether or not the issue has been resolved, for example, based on the resolution metadata. If the issue has been resolved, the process ends at step 440. If the issue has not been resolved, the process returns to step 406 and the PDCA 118 is updated and re-trained based on the data in the PDCA collection database 120.

Referring back to step 418, when the action taken by the TSA comprises collecting more information at step 442, the process returns to step 406 and the PDCA 118 is updated based on the data in the PDCA collection database 120.

The process then proceeds again to step 408 as described above and the PDCA 118 provides the TSA with a new partial telemetry data collection that takes into account the prior partial telemetry data collection, diagnostic data and results, diagnosis, resolution metadata and any other relevant data that led to an incorrect diagnosis or did not otherwise result in a successful resolution to the technical support issue. The process continues in this manner until the TSA performs a resolution action that resolves the technical support issue at step 438 and the process ends at step 440.

It is to be understood that for any methodologies described herein with reference to the flow diagram of FIG. 4, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different information processing systems.

In order to ensure that the PDCA 118 provides the most relevant partial telemetry data collections, and to update and re-train the PDCA 118 when needed, a data collection specification is provided for the PDCA 118. As will be described in more detail below, a reinforcement learning algorithm will rely on the details of this data collection specification when reinforcing or updating the PDCA 118.

The data collection specification comprises the information needed for PDCA 118 to learn how to optimally augment a TSA's knowledge with relevant partial telemetry data collections. It is important to note the distinction between the data collection specification, which is a collection specification on the TSA's issue resolution process and a telemetry data collection specification, which is focused on the telemetry data itself. The data collection specification for PDCA 118 is derived from the detailed issue resolution process shown in FIG. 4.

An extensible markup language (XML) format of an example data collection specification for the PDCA 118 is provided below in pseudocode form:

```
<PDCA_Collection>
    <issue> No boot </issue>
    <technical_support_agent>
        <id> 123456 </id>
        <level> L1 </level>
        <solved cases> 15 </solved cases>
    </technical_support_agent>
    <timestep>
        <step>0</step>
        <partial system collection> xsi:nil </partial system collection>
        <diagnosis> xsi:nil </diagnosis>
    </timestep>
    <timestep>
        <step>1</step>
        <partial system collection> insert first collection by model including power supply alert </partial system collection>
        <diagnostic action>
            <test> power supply fan test </test>
            <result> fail </result>
        </diagnostic action>
        <diagnosis> failed power supply </diagnosis>
    </timestep>
    <timestep>
        <step>2</step>
        <resolution action>
            <action> replace power supply </action>
            <system state> healthy </system state>
        </resolution action>
    </timestep>
</PDCA_Collection>
```

The above pseudocode provides an example of the contents of a data collection specification for a collection in an XML Schema Definition (XSD) file. While discussed with respect to XML, any other format may be utilized. An XSD file defines the elements of an XML-formatted collection. The data collection specification pseudocode provided above specifies a collection created by the process illustrated in FIG. 4. In the example data collection specification there are three elements that are used by the PDCA 118:

1) The curated issue description;
2) The TSA metadata; and
3) The timesteps.

The <issue> header comprises the curated issue description crafted by the TSA. For example, in some embodiments, a standard set of issue descriptions may be generated, curated and provided to the TSA via the GUI to reduce variance in issue descriptions. In other embodiments the TSA may generate the curated issue description that is added to the <issue> header.

The <technical_support_agent> header comprises TSA metadata about the technical support agent, e.g., the experience level of the TSA, e.g., L1, L2, L3, etc., the number of cases solved by the TSA, the ID of the TSA or other metadata.

The most complex portion of the data collection specification is the elements falling under the <timestep> header which comprises the partial telemetry data collections that were already provided to the TSA, the diagnostic & resolution actions that were taken by the TSA along with their test names and test results and the issue status after the resolution actions are performed by the TSA, for example, "Resolved" or "Not Resolved." Each technical support case will be captured in a data collection specification with multiple timesteps, one for each complex action taken by the TSA or the PDCA 118, e.g., as shown by the three complex actions under the headers <timestep> found in the above pseudocode. The algorithm of the PDCA 118 consumes these features to make decisions on which telemetry data to collect.

Two example guided technical support scenarios utilizing the PDCA integration will now be discussed. In the first example scenario, the technical issue is caused by a problem with hardware. In the second example scenario, the technical issue is caused by software. Each of these example scenarios shows situations where the PDCA 118 positively reinforces collection information that aids the TSA's resolution of the technical issue and negatively reinforces collection information that is not helpful to the TSA for resolving the technical issue. This reinforcement mechanism allows the PDCA 118 to continuously learn how to tailor its data collections to both the technical issue and the diagnostic style of an individual TSA working on a particular technical support case.

An example PDCA data collection specification is provided below for the first example scenario.

```
<PDCA_Collection>
    <issue> Lost BIOS config settings and wrong server time after server reset </issue>
    <technical_support_agent>
        <id> 789101 </id>
        <level> L1 </level>
        <solved_cases> 15 </solved_cases>
    </technical_support_agent>
    <timestep>
        <step> 0 </step>
        <PDCA_system_collection>
            <System>
                <Memory_Array>
                    <Slots_Available> 1 </Slots_Available>
                    <Slots_Used> 25 </Slots_Used>
                    <Slot_Numbers_Available> 7 </Slot_Numbers_Available>
                </Memory_Array>
            </System>
        </PDCA_system_collection>
        <diagnostic_action>
            <test> MPMemory Stress Test </test>
            <component> DIMM 7 </component>
            <result> Fail </result>
        </diagnostic_action>
    </timestep>
    <timestep>
        <step> 1 </step>
        <diagnosis> DIMM out of place </diagnosis>
        <resolution_action>
            <action> reseat DIMM </action>
            <issue_status> NOT RESOLVED </issue_status>
        </resolution_action>
        <diagnostic_action>
            <test> MPMemory </test>
            <component> DIMM 7 </component>
            <result> Pass </result>
        </diagnostic_action>
    </timestep>
    <timestep>
        <step> 2 </step>
        <PDCA_system_collection>
            <System>
                <Battery>
```

-continued

```
                    <Probe_Name> System Board CMOS Battery </Probe_Name>
                        <Reading> Not Detected </Reading>
                        <Status> Critical </Status>
                </Battery>
            </System>
        </PDCA_system_collection>
        <diagnostic_action>
            <test> Check Voltage </test>
            <component> CMOS Battery </component>
            <result> Fail </result>
        </diagnostic_action>
    </timestep>
    <timestep>
        <step> 3 </step>
        <diagnosis> CMOS Battery Dead </diagnosis>
        <resolution_action>
            <action> Replace CMOS battery </action>
            <issue_status> RESOLVED </issue_status>
        </resolution_action>
        <diagnostic_action>
            <test> Check Voltage </test>
            <component> CMOS Battery </component>
            <result> Pass </result>
        </diagnostic_action>
    </timestep>
</PDCA_Collection>
```

In the first example scenario, the customer is facing an issue where the BIOS configuration settings are lost upon rebooting their server and they are also seeing that the server clock has not been keeping time properly after a reset. The TSA inputs the curated issue "Lost BIOS config settings and wrong server time after reset" into the GUI and this information as well as the TSA metadata for the agent, e.g., the ID, support level, and number of solved cases, is passed to the PDCA 118 and stored in the corresponding <issue> and <technical support agent> headers of the PDCA data collection specification.

The PDCA 118 returns a partial telemetry data collection showing memory array information, stored under the <PDCA_system_collection> header in timestep 0 of the PDCA data collection specification. In reviewing the partial telemetry data collection, the TSA notices that DIMM slot 7 is available, while the other 25 DIMM slots are full. To confirm that no memory is there, the TSA runs a memory Stress Test on DIMM slot 7, and as expected, receives an error that no memory is found. The TSA records these diagnostic details into the GUI and they are added to the PDCA data collection specification, for example, under the <diagnostic_action> header for timestep 0.

The TSA next diagnoses that a memory module is out of place and may be causing the issue, which is added in a second timestep under the <diagnosis> header.

As shown in the PDCA data collection specification, this TSA is a L1 level TSA with very few solved cases. The TSA has the customer reseat the memory module in DIMM slot 7 and afterwards the memory test passes. However, after a reboot, the customer notices that the issue is still not resolved. The TSA records these resolution actions and the technical issue status, which is again received by the PDCA 118 and stored in the PDCA data collection specification under timestep 1 in the corresponding headers.

The PDCA 118 then collects a new partial telemetry data collection, stored under the timestep 2 and presents it to the TSA. The new partial system collection indicates that the CMOS battery is not detected. The TSA takes a diagnostic action on the CMOS battery to confirm its status. The result of the diagnostic action is that the CMOS battery is dead.

The TSA records this information in the GUI and the information is stored as a diagnostic action in the PDCA data collection specification under timestep 2.

The TSA next diagnoses that the CMOS battery is dead and may be causing the issue, which is added in timestep 3 under the <diagnosis> header. The TSA has the customer replace the CMOS battery which resolves the issue. The TSA records these resolution actions and the issue status, which is again received by the PDCA 118 and stored in the PDCA data collection specification under timestep 3 in the corresponding headers.

In the first example scenario, the PDCA 118 initially provided a partial data collection that incorrectly steered the TSA to reseat the memory module. Since the partial data collection did not result in a successful resolution of the issue, the PDCA 118 provided an additional partial data collection until the issue was resolved. Based on this outcome, the reinforcement learning algorithm, explained in more detail below, will positively reinforce the choice by the PDCA 118 to obtain and present the CMOS battery related partial telemetry data collection to the TSA and negatively reinforce the choice by the PDCA 118 to obtain and present the memory information, given the original issue.

An example PDCA data collection specification is provided below for the second example scenario.

```
<PDCA_Collection>
  <issue> After POST system hangs and screen is blank. </issue>
  <Date_and_Time> 2020/07/01 10:20:34 </Date_and_Time>
  <technical_support_agent>
    <id> 9182736 </id>
    <level> L1 </level>
    <solved_cases> 27 </solved_cases>
  </technical_support_agent>
  <timestep>
    <step> 0 </step>
    <PDCA_system_collection>
      <System>
        <Hardware_Log>
          <Item>
            <Description> Fault detected in drive 0 in disk drive bay 1. </Description>
            <Date_and_Time> 2020/06/29  8:15:21 </Date_and_Time>
            <Severity> Critical </Severity>
          </Item>
          <Item>
            <Description> Drive 0 in disk drive bay 1 is operating normally. </Description>
            <Date_and_Time> 2020/06/29  8:16:45 </Date_and_Time>
            <Severity> OK </Severity>
          </Item>
        </Hardware_Log>
      </System>
    </PDCA_system_collection>
    <diagnostic_action>
      <test> boot as root </test>
      <result> Pass </result>
    </diagnostic_action>
  </timestep>
  <timestep>
    <step> 1 </step>
    <PDCA_system_collection>
      <OS_Name> SUSE Linux Enterprise Server 11 (x86_64) SP4 </OS_Name>
      <System>
        <System_Information>
          <System_BIOS_Setting> 2.5.4 </System_BIOS_Setting>
        </System_Information>
      </System>
    </PDCA_system_collection>
    <diagnostic_action>
      <test> Run FSck </test>
```

-continued

```
      <result> Fail </result>
      <error> Partition doesn't exist </error>
    </diagnostic_action>
  </timestep>
  <timestep>
    <step> 2 </step>
    <diagnosis> MBR (Master Boot Record) has been damaged </diagnosis>
    <resolution_action>
      <action> reinstall grub </action>
      <issue_status> Resolved </issue_status>
    </resolution_action>
    <diagnostic_action>
      <test> reboot </test>
      <result> Pass </result>
    </diagnostic_action>
  </timestep>
</PDCA_Collection>
```

In the second example scenario, the GUI feeds the PDCA 118 both the curated issue "After POST system hangs and screen is black" as written by the TSA and the TSA metadata about the TSA. The PDCA 118 performs a partial data collection and presents hard drive status alerts to the TSA that show that a hard drive was not detected a couple of days ago, only to be detected and in a healthy state again two minutes later. The partial data collection is stored in the corresponding header of the PDCA data collection specification under step 0.

The TSA performs a diagnostic action by asking the customer to boot the server as 'root' and the customer successfully does so. At this point, the TSA decides to pass this information to PDCA 118, which is stored in the corresponding header of the PDCA data collection specification under step 0, and request another partial data collection.

PDCA 118 performs another partial data collection based on this information and provides the TSA with additional information about the operating system and the BIOS settings. This additional information is stored in the corresponding header of the PDCA data collection specification under the step 1.

Given the TSA's knowledge of this particular flavor of Linux, the TSA diagnoses that the master boot record may be damaged and has the customer run a diagnostic tool called FSck. The customer receives an error that a "Partition doesn't exist," which is a red flag that the master boot record has been damaged. This diagnostic information is also stored in the corresponding header of the PDCA data collection specification under step 1.

To fix the master boot record, the TSA has the customer reinstall grub and confirm that the system can reboot normally, which the customer confirms to be the case. The TSA records the diagnostic information and resolution information which is sent to PDCA 118 and stored in the corresponding header of the PDCA data collection specification under step 2. In the second example scenario, the PDCA 118 will positively reinforce the decision to obtain and send a partial data collection comprising operating system information and BIOS information and negatively reinforce the decision to obtain and send a partial data collection comprising hard drive errors for the specified issue for this example.

In illustrative embodiments, the PDCA 118 functions to create a data collection policy which tries to collect and display the smallest amount of telemetry data possible for a TSA and customer to solve a technical issue with minimal effort. An example PDCA reinforcement algorithm for achieving this objective will now be described.

One goal of the PDCA 118 is to learn a policy that maximizes the value of the data collections, for example, as shown in equation (1).

$$\max_{\pi} \mathbb{E}(R_t + \gamma^1 R_{t+1} + \ldots + \gamma^P R_{t+P}) \tag{1}$$

$\pi$ is a policy that defines what data to collect and the sum in the brackets defines the discounted sum of rewards $R_i$ received by the PDCA 118 at each timestep for $y \leq 1$. In this example, the sum is always finite, ranging from the first timestep t up until the last timestep t+P of the recorded issue resolution. For example, the first example scenario described above illustrates a case where the issue is solved on the fourth timestep, e.g., t+3, so the sum would be calculated over four timesteps, e.g., t, t+1, t+2 and t+3. The second example scenario described above illustrates a case where the issue is solved on the third timestep, e.g., t+2, so the sum would be calculated over only three timesteps, e.g., t, t+1 and t+2. The rewards are defined by a sum of multiple terms, each of which only contribute when certain conditions are met with the exception of one constant term, as shown, for example, in equation (2).

$$R_t = -(1 + \delta_t^{diag} + \delta_t^{resolution} + 2\delta_t^{not\ resolved} + (n_t - p_t)$$
$$\delta_t^{data\ collected}) + 32\delta_t^{resolved} \tag{2}$$

The constant term represents a negative reward for each timestep that goes by, so this term is always supplied at each timestep. The $\delta$ terms are equal to 1 when a condition is met and equal to zero otherwise. These conditions are determined by answering the following questions at each timestep:

1) Has a diagnostic action been performed?
2) Has a resolution action been performed?
3) Has the issue not been resolved by a resolution action?
4) Has data been collected by PDCA?
5) Has the issue been resolved by a resolution action?

The n and p terms represent the number data elements collected by the PDCA 118 and the number of data elements that the TSA marks as helpful, respectively. By defining the reward in this way, the PDCA behaviors that help a TSA and customer resolve a case by exerting the least amount of effort to solve the technical issue is rewarded. For example, effort may be captured by the number of timesteps in the case, the number of diagnostic actions performed, the number of resolution steps performed and the number of unnecessary data elements collected by the PDCA 118.

The PDCA 118 makes its data collection decision based on its learned policy $\pi = \pi(A_t|S_t)$, where the action $A_t$ specifies what telemetry data to collect for the state $S_t$ of a technical support case, for example, as indicated in FIG. 3. The PDCA 118 learns this policy by maximizing the return as shown in equation (1) where each term $R_i$ is defined by equation (2). Before specifying how the training of the policy works, it is mathematically convenient to define the state-action value function $Q_\pi(S_t, A_t)$ that represents the expected return as a function of state and action taken at time t by following policy $\pi$ for deciding all future actions. This allows the problem of the PDCA 118 to be formulated as finding the optimal policy $\pi^*$ that maximizes the expected return of the PDCA as shown in equation (3).

$$\pi^* = \operatorname*{argmax}_{\pi} Q_\pi(S_t, A_t) \tag{3}$$

The state $S_t$ of the technical support case, the action $A_t$ of the PDCA 118 to collect a partial telemetry data collection and the policy $\pi$ of the PDCA 118 may be defined as follows.

The state $S_t$ of the technical support case is defined mathematically by a neural network that uses four parts as an input:

1) TSA metadata (TS).
2) Curated issue description (IS).
3) Diagnostic actions and results (DA).
4) Resolution actions and results (RA).

The state $S_t$ of the technical support case may be defined using equations (4)-(8) as follows:

$$S_t = \mathrm{reLu}(W[S_{TS} \oplus S_{IS} \oplus S_{DA} \oplus S_{RA}] + b) \tag{4}$$

$$S_{TS} = \mathrm{reLu}(W_{TS}[x_{ID}{}^I \oplus x_{level}{}^{II} \oplus x_{cases}{}^{III}] + b_{TS}) \tag{5}$$

$$S_{IS} = \mathrm{reLu}(W_{IS}[x_{issue}{}^I] + b_{IS}) \tag{6}$$

$$S_{DA} = \mathrm{reLu}(W_{DA}[x_{Dtest}{}^I \oplus x_{Dresult}{}^I \oplus x_{Derror}{}^I] + b_{DA}) \tag{7}$$

$$S_{RA} = \mathrm{reLu}(W_{RA}[x_{Rtest}{}^I \oplus x_{Rresult}{}^I] + b_{RA}) \tag{8}$$

The W and b terms are the matrices and vectors that make up the parameters of the neural network. $\mathrm{reLu}(\ldots)$ represents the relu activation function, $\oplus$ represents vector concatenation and the superscript of the x terms represent how each piece of input data is transformed, where the I superscript means the raw data is one-hot encoded and then transformed by a one linear layer, the II superscript indicates that the raw data is one-hot encoded only, and the III superscript indicates that the data undergoes no additional transformation. Regardless of superscript, initially all data is scaled from 0 to 1 prior to entering the network. For concrete examples of this input data, reference is made back to the PDCA data collection specifications of the first and second example scenarios described above. The subscripts of the x terms align with elements found in the PDCA data collection specifications mentioned above.

Any given action $A_t$ derives from a sparse vector $x_{action}{}^{binary}$, where all entries equal to 1 represent a telemetry data element that should be collected by the PDCA 118 and all entries represented by 0 are not to be collected, as shown, for example, in equation (9).

$$A_t = \mathrm{relu}(W_{action} x_{action}{}^{binary} + b_{action}) \tag{9}$$

The policy decisions made by the PDCA 118 are decided by the policy $\pi(A_t|S_t)$ which in some embodiments is determined by a deep Q-network (DQN), a neural network which calculates $Q_\pi(S_t, A_t)$ using a neural network parameterized by weights $\theta$. For mathematical convenience all weight W and b terms of equations (4)-(9) as well as additional weights $W_Q$ and $b_Q$ are represented by the set of weights $\theta$. $Q_\pi(S_t, A_t)$ may then be defined according to equation (10).

$$Q_\pi(S_t, A_t, \theta) = \mathrm{relu}(W_Q[S_t \oplus A_t] + b_Q) \tag{10}$$

The policy for the PDCA 118 can then be inferred from Q by selecting the action that maximizes the return given the current state, as shown, for example, in equation (11). In some embodiments, ties may be broken arbitrarily.

$$A_t = \operatorname*{argmax}_{a} Q_{\pi^*}(S_t, a) \tag{11}$$

Since the argmax operation will require a sweep through the entire action space at each timestep it may be inefficient for the action space to be realistically indexed by a simple element, also referred to herein as an attribute, within the collection, which may, for example, correspond to roughly $2^{5000}$ possible actions. Instead, the collection may be divided into an arbitrary number of complex elements, e.g., 12 complex elements or any other number of complex elements, where each complex element can be collected or not collected as a batch. Since each complex element contains many simple elements, in the example of 12 complex elements there would be $2^{12}$=4096 possible collection actions. While 12 complex elements may provide greater efficiency for the sweep through the action space, any other number of complex elements or grouping of elements may be alternatively utilized. An example grouping of complex elements for the telemetry data collections is shown in table 500 of FIG. 5.

The example of table 500 shows the logical grouping of complex elements into partial collection IDs 1 through 12. Each complex element contains multiple simple data elements. While most complex elements contain a dozen or so simple elements, a full telemetry data collection may comprise hundreds to thousands of simple elements. By grouping the simple elements into complex elements and even further into partial collection IDs, the action space may be reduced from roughly $2^{5000}$ possible partial data collections to roughly $2^{12}$=4096 possible partial data collections.

The policy of the PDCA 118 may be trained in both offline and online settings. The initial offline training of the PDCA 118 utilizes collections of historical cases captured in the format shown in the pseudocode for the PDCA data collection specifications described above. In some embodiments, each line of a PDCA data collection specification that proved to be useful in resolving an issue may be manually marked with an indication such as, e.g., a (+), by the TSA that solved the case through the GUI. In some cases, elements from the PDCA data collection specification which are not useful should not be marked by the TSA.

Given the current state and action of the technical support case at time t and both the state transitioned to and the reward received at time t+1, the target value of the DQN may be derived from the Bellman equation by using a single timestep sample approximation of the expectation value where the value of the next state-action pair is bootstrapped as shown in equation (12).

$$y_t = R_{t+1} + \gamma \mathrm{argmax}_a Q_\pi(S_{t+1}, a, \theta) \quad (12)$$

In some example scenarios, the network is trained by gradient descent updates to the weights θ of the DQN where the gradient of the expected loss is computed over mini-batches of previous cases. The loss function used for training may be given by the mean-squared error between the target and the value $Q_\pi(S_t, A_t, \theta)$ where θ' represents the DQN's weights prior to the last gradient update. This loss function may be used to train a double-DQN, which may be a helpful approach for reducing the positive bias introduced to Q(.) from using the argmax of a bootstrapped Q value as shown in equation (13).

$$L_t(\theta) = \mathbb{E}_{S_t, A_t \sim \pi}(y_t - Q_\pi(S_t, A_t, \theta'))^2 \quad (13)$$

In addition to the reinforcement learning, planning may be utilized in the form of prioritized experience replay, where, for example, after 8 minibatches of training, prior state transitions may be revisited in a prioritized queue, e.g., a queue of size 128, where priority is measured by a magnitude of the loss shown in equation (13). In some cases, planning cannot start until a sufficient number of transitions, e.g., 128 in the above example, have been recorded in the training data.

When the PDCA 118 generates a query, as shown in FIG. 4, it takes all of the input data and transforms it into the state $S_t$ using equations (4)-(8). Next, the PDCA 118 selects the greedy action according to equation (11), which corresponds to collecting and displaying a specific piece of the telemetry data collection that is most likely to assist a particular TSA in solving the given issue with minimum effort. In some cases, during initial deployment of the PDCA 118, e.g., fewer than a predetermined number of uses, in every 5 out of 100 usages of the PDCA 118, the PDCA 118 may choose to collect a random partial data collection. This encourages the PDCA 118 to try new approaches in aiding the TSA in solving the issues which may enhance the training of the PDCA 118. In some embodiments, the predetermined number of cases may be any number of cases and the number or percentage of cases in which the PDCA 118 chooses to collect a random partial telemetry data collection may also be any other number. In some embodiments, once the PDCA 118 has experienced a sufficient number of cases as defined, for example, by an administrator of the PDCA 118, the random partial telemetry data collection mechanism, also referred to as epsilon-greedy, can be removed or disabled. For example, when no new types of issues are expected to occur or no new types of solutions are expected to be required as compared to the previous issues and resolutions.

When the PDCA 118 is deployed and training online, it may, in some example embodiments, be trained using Monte Carlo updates instead of temporal difference updates, which may require a technical support case to be resolved before updating the weight values. In some cases, this may be a requirement since the TSA did not know what collection data was useful for solving the issue until the issue was solved. In such a case, the updating of the weights and usage of experience replay may follow the equations described above.

The integration of the PDCA 118 into the technical support process provides various benefits. For example, by providing only partial telemetry data collections of relevant data to a TSA, with the data collection strategy tailored to both the technical issue and the TSA's diagnostic style and experience, the amount of data that needs to be collected by the PDCA 118 may be minimized while also minimizing the issue resolution time. The PDCA data collection specification described above also enables the capturing of diagnostic, resolution and partial system collection data in a time-series format which clearly delineates the actions of the PDCA 118 and the TSA. The multi-component feedback signal fed to the PDCA 118, for example, as illustrated by equation (2), may be utilized for both online and offline reinforcement learning where the feedback signal may be composed of diagnostic results, resolution results and technician positive ratings of useful data collection elements. In addition, the combination of telemetry data elements into a hierarchical grouping of complex data elements significantly reduces the number of possible actions that need to be taken for reinforcement learning as shown in table 500 of FIG. 5. By providing the TSA with three decisions at each timestep when determining a next action, e.g., 1) perform a diagnostic test; 2) establish a diagnosis; or 3) collect more data, as described above with reference to the process of FIG. 4, the technical support process provides an explicit distinction between diagnostic actions and resolution actions that may be utilized to further train the PDCA 118. The use of two different learning methods for the policy differentiated by offline and online learning contexts, e.g., temporal difference updates for offline learning and Monte Carlo updates for online learning, provides a more robust learning model for the PDCA 118 that is not dependent on only a single policy.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102, a storage controller such as storage controller 108 and a backend support system such as backend support system 116 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device, storage controller or backend support system, a given such processing device may correspond to one or more virtual machines or other types of virtualization infrastructure such as Docker containers or Linux containers (LXCs). The host device 102, storage controller 108 or backend support system 116, as well as other system components, may be implemented at least in part using processing devices of such processing platforms. For example, in a distributed implementation of the storage controller 108 or backend support system 116, respective distributed modules of such a storage controller or backend support system can be implemented in respective containers running on respective ones of the processing devices of a processing platform.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices, storage controllers or backend support systems with the above-described functionality will now be described in greater detail with reference to FIGS. 6 and 7. Although described in the context of system 100, these platforms may also be used to implement at least portions of other information processing systems in other embodiments.

Figure 6:
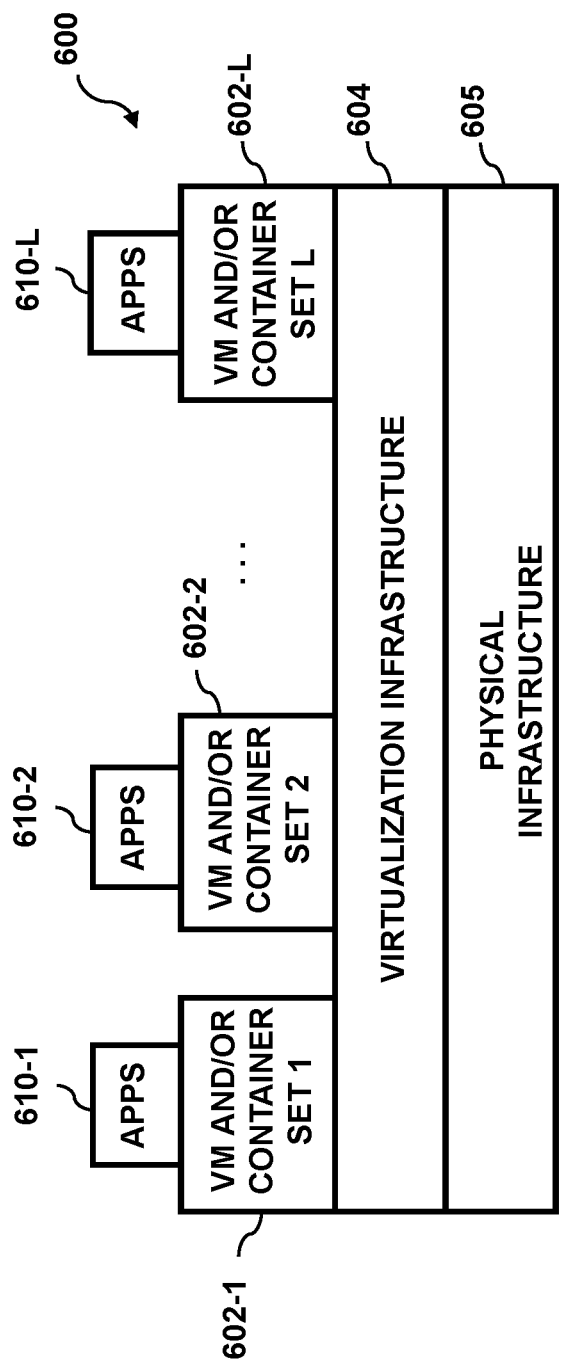
FIGS. 6 and 7 show examples of processing platforms that may be utilized to implement at least a portion of an information processing system in an illustrative embodiment.
Figure 7:
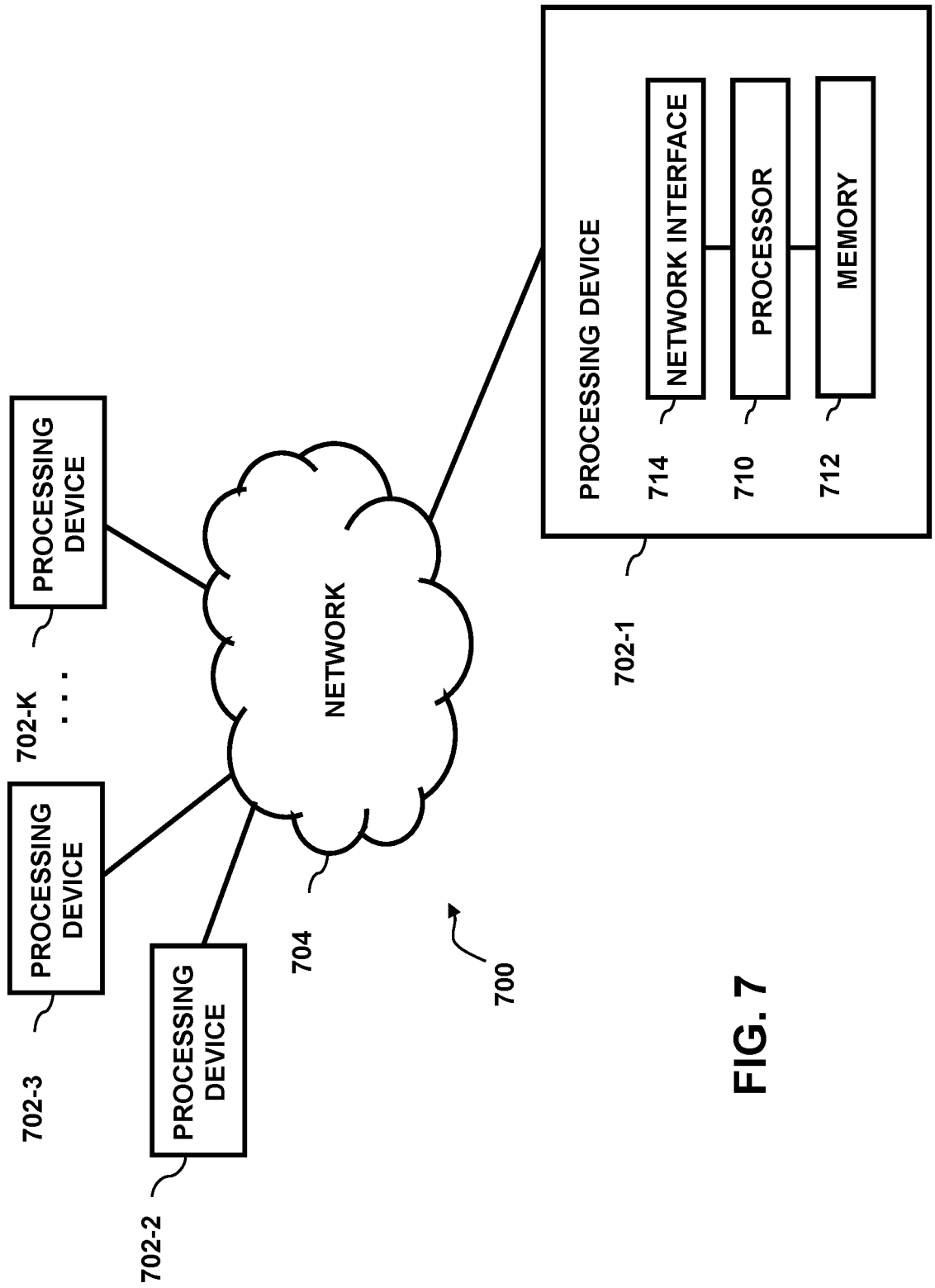

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality of the type described above in the illustrative embodiments for one or more processes running on a given one of the VMs. For example, each of the VMs can implement the above-described functionality of the illustrative embodiments in the system 100.

A hypervisor platform that implements a hypervisor within the virtualization infrastructure 604 may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality of the type described above in the illustrative embodiments. For example, a container host device supporting multiple containers of one or more container sets can implement one or more cores executing the above-described functionality of the illustrative embodiments.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of an information processing system as disclosed above in the illustrative embodiments are illustratively implemented in the form of software running on one or more processing devices.

It should again be emphasized that the above-described embodiments are presented for purposes of illustration only. Many variations and other alternative embodiments may be used. For example, the disclosed techniques and functionality described above in the illustrative embodiments are applicable to a wide variety of other types of information processing systems, host devices, storage systems, backend support systems or other systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to memory, the at least one processing device being configured:
to implement a data collection agent;
to obtain a telemetry data collection specification;
to train the data collection agent based at least in part on the telemetry data collection specification;
to obtain an issue description corresponding to a technical support issue associated with a source device of an information processing system;
to generate a telemetry data collection query based at least in part on the obtained issue description using the trained data collection agent;
to submit the query to the source device;
to obtain, from the source device, telemetry data generated based at least in part on the query; and
to present the telemetry data to a user via a graphical user interface;
wherein operation of the data collection agent is controlled at least in part utilizing a reinforcement learning algorithm to adjust an amount and type of telemetry data to be requested in one or more subsequent telemetry data collection queries generated for one or more respective issue descriptions, the reinforcement learning algorithm positively reinforcing collection of telemetry data that facilitates resolution of a given technical support issue having a corresponding issue description and negatively reinforcing collection of telemetry data that does not facilitate resolution of the given technical support issue having the corresponding issue description, the amount and type of telemetry data collected by the data collection agent therefore varying over time under the control of the reinforcement learning algorithm for at least the given technical support issue.

2. The apparatus of claim 1 wherein the at least one processing device is further configured:
to obtain an input from the user via the graphical user interface, the input comprising at least one action;
to obtain information indicating a result of the at least one action; and
to re-train the data collection agent based at least in part on the obtained information.

3. The apparatus of claim 2:
wherein the at least one processing device is further configured:
to store information corresponding to the issue description in the telemetry data collection specification; and
to store at least one of the following in the telemetry data collection specification in conjunction with the information corresponding to the issue description:
information corresponding to the obtained telemetry data;
information corresponding to the at least one action; and
the information indicating the result of the at least one action; and
wherein re-training the data collection agent based at least in part on the obtained information comprises re-training the data collection agent based at least in part on the telemetry data collection specification.

4. The apparatus of claim 3:
wherein the telemetry data collection specification comprises a plurality of steps, at least a first of the steps corresponding to the telemetry data generated based at least in part on the query generated by the data collection agent and at least a second of the steps corresponding to the at least one action input by the user;
wherein the at least one processing device is further configured to determine an influence of each step toward a resolution of the technical support issue; and
wherein re-training the data collection agent based at least in part on the telemetry data collection specification comprises re-training the data collection agent based at least in part on the determined influence for each step.

5. The apparatus of claim 3:
wherein the re-training of the data collection agent comprises at least one of an offline mode of re-training and an online mode of re-training;
wherein the offline mode of re-training comprises utilizing a temporal difference updates model of re-training; and
wherein the online mode of re-training comprises utilizing a Monte Carlo updates model of re-training.

6. The apparatus of claim 1:
wherein the source device comprises a module that is configured to generate a set of telemetry data corresponding to a plurality of attributes of the source device; and
wherein the trained data collection agent is configured to generate the telemetry data collection query such that the telemetry data collection query is configured to request telemetry data corresponding to a specific portion of the plurality of attributes of the source device from the module of the source device, the specific portion being less than the full plurality of attributes.

7. The apparatus of claim 6:
wherein the at least one processing device is configured to assign each of the attributes of the plurality of attributes of the source device to a corresponding attribute group of a plurality of attribute groups such that the plurality of attributes is divided among the plurality of attribute groups, the number of attribute groups in the plurality of attribute groups being smaller than the number of attributes in the plurality of attributes; and
wherein the specific portion of the plurality of attributes requested by the telemetry data collection query corresponds to the attributes assigned to at least one of the attribute groups.

8. A method comprising:
implementing a data collection agent;
obtaining a telemetry data collection specification;
training the data collection agent based at least in part on the telemetry data collection specification;
obtaining an issue description corresponding to a technical support issue associated with a source device of an information processing system;
generating a telemetry data collection query based at least in part on the obtained issue description using the trained data collection agent;
submitting the query to the source device;
obtaining, from the source device, telemetry data generated based at least in part on the query; and
presenting the telemetry data to a user via a graphical user interface;
wherein operation of the data collection agent is controlled at least in part utilizing a reinforcement learning algorithm to adjust an amount and type of telemetry data to be requested in one or more subsequent telemetry data collection queries generated for one or more respective issue descriptions, the reinforcement learning algorithm positively reinforcing collection of telemetry data that facilitates resolution of a given technical support issue having a corresponding issue description and negatively reinforcing collection of telemetry data that does not facilitate resolution of the given technical support issue having the corresponding issue description, the amount and type of telemetry data collected by the data collection agent therefore varying over time under the control of the reinforcement learning algorithm for at least the given technical support issue; and
wherein the method is implemented by at least one processing device comprising a processor coupled to memory.

9. The method of claim 8 wherein the method further comprises:
obtaining an input from the user via the graphical user interface, the input comprising at least one action;
obtaining information indicating a result of the at least one action; and
re-training the data collection agent based at least in part on the obtained information.

10. The method of claim 9:
wherein the method further comprises:
storing information corresponding to the issue description in the telemetry data collection specification; and
storing at least one of the following in the telemetry data collection specification in conjunction with the information corresponding to the issue description:
information corresponding to the obtained telemetry data;
information corresponding to the at least one action; and
the information indicating the result of the at least one action; and
wherein re-training the data collection agent based at least in part on the obtained information comprises re-training the data collection agent based at least in part on the telemetry data collection specification.

11. The method of claim 10:
wherein the telemetry data collection specification comprises a plurality of steps, at least a first of the steps corresponding to the telemetry data generated based at least in part on the query generated by the data collection agent and at least a second of the steps corresponding to the at least one action input by the user;
wherein the method further comprises determining an influence of each step toward a resolution of the technical support issue; and
wherein re-training the data collection agent based at least in part on the telemetry data collection specification comprises re-training the data collection agent based at least in part on the determined influence for each step.

12. The method of claim 10:
wherein the re-training of the data collection agent comprises at least one of an offline mode of re-training and an online mode of re-training;
wherein the offline mode of re-training comprises utilizing a temporal difference updates model of re-training; and
wherein the online mode of re-training comprises utilizing a Monte Carlo updates model of re-training.

13. The method of claim 8:
wherein the source device comprises a module that is configured to generate a set of telemetry data corresponding to a plurality of attributes of the source device; and wherein the trained data collection agent is configured to generate the telemetry data collection query such that the telemetry data collection query is configured to request telemetry data corresponding to a specific portion of the plurality of attributes of the source device from the module of the source device, the specific portion being less than the full plurality of attributes.

14. The method of claim 13:
wherein the method further comprises assigning each of the attributes of the plurality of attributes of the source device to a corresponding attribute group of a plurality of attribute groups such that the plurality of attributes is divided among the plurality of attribute groups, the number of attribute groups in the plurality of attribute groups being smaller than the number of attributes in the plurality of attributes; and
wherein the specific portion of the plurality of attributes requested by the telemetry data collection query corresponds to the attributes assigned to at least one of the attribute groups.

15. A computer program product comprising a non-transitory processor-readable storage medium having stored therein program code of one or more software programs, wherein the program code when executed by at least one processing device, the at least one processing device comprising a processor coupled to memory, causes the at least one processing device:
to implement a data collection agent;
to obtain a telemetry data collection specification;
to train the data collection agent based at least in part on the telemetry data collection specification;
to obtain an issue description corresponding to a technical support issue associated with a source device of an information processing system;
to generate a telemetry data collection query based at least in part on the obtained issue description using the trained data collection agent;
to submit the query to the source device;
to obtain, from the source device, telemetry data generated based at least in part on the query; and
to present the telemetry data to a user via a graphical user interface;
wherein operation of the data collection agent is controlled at least in part utilizing a reinforcement learning algorithm to adjust an amount and type of telemetry data to be requested in one or more subsequent telemetry data collection queries generated for one or more respective issue descriptions, the reinforcement learning algorithm positively reinforcing collection of telemetry data that facilitates resolution of a given technical support issue having a corresponding issue description and negatively reinforcing collection of telemetry data that does not facilitate resolution of the given technical support issue having the corresponding issue description, the amount and type of telemetry data collected by the data collection agent therefore varying over time under the control of the reinforcement learning algorithm for at least the given technical support issue.

16. The computer program product of claim 15 wherein the program code further causes the at least one processing device:
to obtain an input from the user via the graphical user interface, the input comprising at least one action;
to obtain information indicating a result of the at least one action; and
to re-train the data collection agent based at least in part on the obtained information.

17. The computer program product of claim 16:
wherein the program code further causes the at least one processing device:
to store information corresponding to the issue description in the telemetry data collection specification; and
to store at least one of the following in the telemetry data collection specification in conjunction with the information corresponding to the issue description:
information corresponding to the obtained telemetry data;
information corresponding to the at least one action; and
the information indicating the result of the at least one action; and
wherein re-training the data collection agent based at least in part on the obtained information comprises re-training the data collection agent based at least in part on the telemetry data collection specification.

18. The computer program product of claim 17:
wherein the telemetry data collection specification comprises a plurality of steps, at least a first of the steps corresponding to the telemetry data generated based at least in part on the query generated by the data collection agent and at least a second of the steps corresponding to the at least one action input by the user;
wherein the program code further causes the at least one processing device to determine an influence of each step toward a resolution of the technical support issue; and
wherein re-training the data collection agent based at least in part on the telemetry data collection specification comprises re-training the data collection agent based at least in part on the determined influence for each step.

19. The computer program product of claim 17:
wherein the re-training of the data collection agent comprises at least one of an offline mode of re-training and an online mode of re-training;
wherein the offline mode of re-training comprises utilizing a temporal difference updates model of re-training; and
wherein the online mode of re-training comprises utilizing a Monte Carlo updates model of re-training.

20. The computer program product of claim 15:
wherein the source device comprises a module that is configured to generate a set of telemetry data corresponding to a plurality of attributes of the source device;
wherein the trained data collection agent is configured to generate the telemetry data collection query such that the telemetry data collection query is configured to request telemetry data corresponding to a specific portion of the plurality of attributes of the source device from the module of the source device, the specific portion being less than the full plurality of attributes;
wherein the program code further causes the at least one processing device to assign each of the attributes of the plurality of attributes of the source device to a corresponding attribute group of a plurality of attribute groups such that the plurality of attributes is divided among the plurality of attribute groups, the number of attribute groups in the plurality of attribute groups being smaller than the number of attributes in the plurality of attributes; and wherein the specific portion of the plurality of attributes requested by the telemetry data collection query corresponds to the attributes assigned to at least one of the attribute groups.

\* \* \* \* \*